United States Patent [19]

Vogdes

[11] Patent Number: 4,540,727

[45] Date of Patent: Sep. 10, 1985

[54] POLYAMIDE COMPOSITIONS

[75] Inventor: Christine E. Vogdes, Albany, Calif.

[73] Assignee: Raychem Corporation, Menlo Park, Calif.

[21] Appl. No.: 437,657

[22] Filed: Oct. 29, 1982

[51] Int. Cl.$^3$ ............................ C08K 3/34; C08K 3/22

[52] U.S. Cl. ...................................... 524/83; 524/120; 524/222; 524/254; 524/257; 524/258; 524/239; 524/291; 524/399; 524/413; 524/423; 524/430; 524/432; 524/437; 524/450; 524/607; 204/159.19

[58] Field of Search ................ 524/83, 120, 239, 291, 524/413, 430, 432, 437, 423, 450, 607, 254, 257, 258, 399, 222; 204/159.19

[56] References Cited

U.S. PATENT DOCUMENTS

| | | | |
|---|---|---|---|
| 3,108,091 | 10/1963 | Illing et al. | 524/413 |
| 3,285,855 | 11/1966 | Dexter et al. | 524/291 |
| 3,290,392 | 12/1966 | Ecke et al. | 524/351 |
| 3,366,599 | 1/1968 | Heuck et al. | 524/351 |
| 3,435,005 | 3/1969 | Dexter et al. | 524/239 |
| 3,454,412 | 7/1969 | Stokes | 106/287 |
| 3,595,936 | 7/1971 | Birenzvige et al. | 260/857 |
| 3,640,761 | 2/1972 | Hamanaka et al. | 524/398 |
| 3,642,971 | 2/1972 | Griehl et al. | 524/607 |
| 3,741,909 | 6/1973 | Yamane et al. | 524/351 |
| 3,773,707 | 11/1973 | Hermann | 524/450 |
| 3,787,355 | 1/1974 | Linhart et al. | 524/222 |
| 3,833,534 | 9/1974 | Tierney et al. | 524/437 |
| 3,842,705 | 10/1974 | Woodard et al. | 204/159.19 |
| 3,860,558 | 1/1975 | Klemchuk | 524/222 |
| 3,876,608 | 4/1975 | Anderson et al. | 523/220 |
| 4,064,100 | 12/1977 | Hechenbleikner | 524/119 |

FOREIGN PATENT DOCUMENTS

| | | |
|---|---|---|
| 677447 | 1/1964 | Canada . |
| 42316 | 12/1981 | European Pat. Off. . |
| 2428656 | 1/1980 | France . |
| 49-20058 | 5/1974 | Japan . |
| 52-32046 | 3/1977 | Japan . |
| 55-108453 | 11/1980 | Japan . |
| 5767638 | 8/1982 | Japan . |

OTHER PUBLICATIONS

Condensed Chemical Dictionary, p. 49—Eighth Edition, Reinhold Co., European Search Report, EP83-3-0-6585.

*Primary Examiner*—Veronica P. Hoke
*Attorney, Agent, or Firm*—Timothy H. P. Richardson; Herbert G. Burkard

[57] ABSTRACT

The high temperature aging of polyamides is substantially improved by incorporating therein an antioxidant and an oxide of a metal of Group II or III of the Periodic Table, preferably a crystalline aluminosilicate such as a synthetic zeolite. The amount of antioxidant is preferably 1 to 5% and the amount of metal oxide is preferably 0.5 to 5%. Polyamides which can be stabilized in this way include Nylon-6, Nylon-11 and Nylon-12.

39 Claims, No Drawings

POLYAMIDE COMPOSITIONS

BACKGROUND OF THE INVENTION

1. Field of the Invention

This invention relates to polyamide compositions containing stabilizers which retard embrittlement of the polyamide when exposed to high temperatures.

2. Introduction of the Invention

When exposed to elevated temperatures, polyamides become brittle. Many polyamides are commercially available in the form of stabilized compositions which contain limited amounts, less than 0.5% by weight, of antioxidants. However, even these stabilized compositions fall far short of practical requirements.

SUMMARY OF THE INVENTION

I have now discovered that the embrittlement of polyamides can be retarded by incorporating therein an antioxidant and an oxide of a metal of Group II or III of the Periodic Table.

In one aspect, the present invention provides a composition which comprises (a) an organic polymer component which comprises a polyamide:

(b) distributed in said polymer component, at least 0.5% by weight, based on the weight of the polyamide, of an antioxidant; and (c) dispersed in said polymer component, a compound of a metal of Group II or III of the Periodic Table which can function as an acid scavenger, preferably an oxide, chloride or sulfate.

DETAILED DESCRIPTION OF THE INVENTION

The organic polymer component generally comprises at least 70%, preferably at least 80%, particularly at least 90%, especially essentially 100%, of at least one polyamide. [Percentages are by weight throughout this specification.] The polyamide generally comprises at least 25%, preferably at least 75%, particularly essentially 100%, of units having the formula

—NH—(CH$_2$)$_p$—CO— where p is an integer, preferably 6, 9, 10, 11 or 12. Preferred polyamides are Nylon-6 (polycaprolactam), Nylon-6,6 (polyhexamethylene adipamide), Nylon-6,9 (polyhexamethylene azelaamide), Nylon-6,10 (polyhexamethylene sebacamide), Nylon-6,12 (polyhexamethylene dodecanoamide), Nylon-11 (polyundecanoamide) and Nylon-12 (polydodecanoamide). The polymer component can (but preferably does not) contain one or more other polymers which are not polyamides, e.g. an olefin homopolymer or copolymer.

The metal compound which is used (in conjunction with an antioxidant) as a stabilizer in this invention is a compound of a metal of Group II or III of the Periodic Table, preferably Mg, Ca, Zn, Mn or Al. Oxides are the preferred metal compounds. The oxide may be present as a discrete compound, e.g. zinc oxide or alumina, or as part of a mixed oxide, e.g. a crystalline aluminosilicate or other mineral. Two or more oxides can be used together. Particularly good results have been obtained using a zeolitic molecular sieve, preferably a synthetic zeolite. Suitable zeolites are disclosed in the Encyclopaedia of Chemical Technology (Kirk-Othmer), 3rd Edition, Volume 15, pages 638–669, the disclosure of which is incorporated herein by reference. The amount of oxide used is at least 0.5%, e.g. 0.5 to 5%, especially at least 1%, e.g. 1 to 3%, by weight of the polyamide. The oxide is preferably free from any coupling agent or other additive which substantially reduces its efficacy as an acid scavenger.

The amount of antioxidant used in this invention is at least 0.5%, e.g. 0.5 to 7.5%, preferably 1 to 5%, based on the weight of the polyamide. Any type of antioxidant can be used in this invention, but particularly good results have been obtained using the following classes of antioxidant:

(1) aromatic compounds containing amine groups, preferably a reaction product of an aromatic polyamine and an aliphatic ketone, e.g. di-naphthyl-p-phenylene diamine or a reaction product of diphenylamine and acetone;

(2) aromatic mercapto compounds and salts thereof, e.g. a metal salt of 2-mercapto benzothiazole; and (3) compounds containing at least one, preferably two or more, hindered phenol moieties, e.g. a 3,5-di-t-butyl-4 hydroxy phenyl group, for example N,N'-hexamethylene bis(3,5-di-t-butyl-4-hydroxy hydrocinnamide) or tetrakis[methylene3-3',5'-di-t-butyl-4-hydroxy phenylpropionate]methane.

The antioxidant will usually be a discrete compound which is dispersed in the polymer but the invention includes antioxidants which are chemically linked to the polymer.

The compositions of the invention can be in the form of compositions suitable for melt-shaping, e.g. by extrusion or molding, or in the form of shaped articles, which can optionally be cross-linked, e.g. by irradiation. Particularly useful are cross-linked articles which have been rendered heat-recoverable. In this connection, reference should be made to copending and commonly assigned Application Ser. No. 324,222, filed Nov. 23, 1981 by Richards et al., which describes the radiation cross-linking of polyamides comprising substantial amounts of Nylon-11 and Nylon-12 units and the disclosure of which is incorporated herein by reference.

The compositions can contain other ingredients, in addition to the polymer, antioxidant and metal oxide, e.g. organic and/or inorganic flame retardants, fillers and processing aids. The amount of such additives may be, for example, 10 to 40% by weight of the composition. Preferred flame retardants are disclosed in Ser. No. 324,222 incorporated by reference herein. The compositions preferably contain sufficient pigment to mask the yellowing of the polyamide which often takes place on exposure to elevated temperatures.

EXAMPLES

The invention is illustrated by the following Examples, which are summarized in the Table below and a number of which are comparative Examples. The ingredients and amounts thereof (in parts by weight) shown in the Table were mixed together in a Brabender Plasticorder, and the mixture was pressed into slabs about 0.025 inch (0.06 cm) thick. Some of the slabs were cross-linked by irradiating them to a dosage of about 2.5 Mrad. Three strips, each about 0.125 inch (0.32 cm) wide, were cut from each slab. The strips were aged in an oven at the indicated temperature and were removed for testing at appropriate intervals (generally at intervals of 16–24 hours, except in Examples 47–55, where the intervals were about 48 hours). After removal, the strips were allowed to cool to room temperature and were then wrapped 360° around a mandrel of diameter 0.25 inch (0.64 cm). The failure time shown in the Table was the time at which at least two out of three strips broke or cracked when wrapped around the mandrel. The strips were returned to the oven if they passed the test.

The various ingredients used in the Examples are further clarified below.

POLYAMIDES

Nylon 11 is Besno, a virgin Nylon 11 sold by Rilsan Corp.

Nylon 11 (stabilized) is Besno-TL, a stabilized Nylon-11 sold by Rilsan Corp. As indicated by the asterisk in the Table, this product contains an antioxidant, in an amount which is believed to be substantially less than 0.5%.

Nylon 12 is a virgin Nylon 12 sold by Huls under the trade designation Huls 2101.

Nylon 12 (stabilized) is a stabilized Nylon 12 sold by Huls under the trade designation Huls 2121. As indicated by the asterisk in the Table, this product contains an antioxidant, in an amount which is believed to be substantially less than 0.5%.

Ionomer is a carboxylic-acid-modified polyethylene sold by du Pont under the trade name Surlyn.

ANTIOXIDANT

Aminox is a reaction product of diphenylamine and acetone sold by Uniroyal.

Zetax is a Zn salt of 2-mercaptobenzothiazole sold by R. T. Vanderbilt.

Irganox 1098 is N,N′ hexamethylene bis[3,5 di-t-butyl-4-hydroxy phenylpropionate]methane sold by Ciba Geigy.

Irganox 1010 is tetrakis[methylene 3-(3′,5′-di-t-butyl-4′-hydroxy phenyl)propionate]methane sold by Ciba Geigy.

Weston 618 is distearyl pentaerythritol diphosphite, sold by Borg Warner.

Plastanox 1212 is a mixture of distearylthiodipropionate and dilaurylthiodipropionate sold by American Cyanamid.

Ferroant is an oligomer of 4,4-thio bis(3-methyl-6-t-butyl phenol with an average degree of polymerization of 3–4, as described in in U.S. Pat. No. 3,986,981.

Agerite White is di-naphthyl-p-phenylenediamine sold by R. T. Vanderbilt.

Crosslinking Agent is triallyl isocyanate.

Pigment is a mixture of 3 parts of titanium dioxide and 1 part of Monastral Green.

Zeolite is a molecular sieve sold by Union Carbide under the trade designation Linde 13× and reported to have the formula $Na_{86}[(AlO_2)_{86} (SiO_2)_{106}]$: 276 $H_2O$.

| Example No. | 1 | 2 | 3 | 4 | 5 | 6 | 7 | 8 | 9 | 10 | 11 | 12 | 13 |
|---|---|---|---|---|---|---|---|---|---|---|---|---|---|
| POLYAMIDE | | | | | | | | | | | | | |
| Nylon 11 | 100 | — | 99.6 | 99.6 | 99.6 | 99.6 | 99.0 | 98.5 | 78.5 | 98.5 | 78.5 | 98.5 | 98.0 |
| Nylon 11 (stabilized) | — | 100 | — | — | — | — | — | — | — | — | — | — | — |
| Nylon 12 | — | — | — | — | — | — | — | — | — | — | — | — | — |
| Nylon 12 (stabilized) | — | — | — | — | — | — | — | — | — | — | — | — | — |
| Nylon 6 | — | — | — | — | — | — | — | — | — | — | — | — | — |
| IONOMER | — | — | — | — | — | — | — | 20 | — | 20 | — | — | — |
| ANTIOXIDANT | | * | | | | | | | | | | | |
| Aminox | — | — | 0.16 | — | — | 0.10 | 0.125 | 0.125 | 0.125 | — | — | 0.250 | 0.250 |
| Zetax | — | — | 0.24 | — | — | 0.15 | 0.188 | 0.188 | 0.188 | — | — | 0.375 | 0.375 |
| Irganox 1098 | — | — | — | — | — | — | — | — | — | — | — | — | — |
| Irganox 1010 | — | — | — | — | — | — | — | — | — | — | — | — | — |
| Weston 618 | — | — | — | — | — | — | — | — | — | 0.083 | 0.083 | — | — |
| Plastanox 1212 | — | — | — | — | — | — | — | — | — | — | — | — | — |
| Ferroant | — | — | — | — | — | — | — | — | — | — | — | — | — |
| Age Rite White | — | — | — | — | — | — | — | — | — | 0.25 | 0.25 | — | — |
| CROSS-LINKING AGENT | — | — | — | — | — | — | 0.50 | 1.0 | 1.0 | 1.0 | 1.0 | 0.50 | 1.0 |
| PIGMENT | — | — | — | — | — | — | — | — | — | — | — | — | — |
| ZINC OXIDE | — | — | — | — | 0.40 | 0.15 | 0.188 | 0.188 | 0.188 | 0.17 | 0.17 | 0.375 | 0.375 |
| ZEOLITE | — | — | — | 0.40 | — | — | — | — | — | — | — | — | — |
| $SiO_2$ + $Al_2O_3$ (106:86) | — | — | — | — | — | — | — | — | — | — | — | — | — |
| FAILURE TIME (hours) | | | | | | | | | | | | | |
| at 150° C., not X-linked | 12 | 264 | 264 | 96 | 192 | 312 | 364 | 360 | 144 | 312 | 216 | 548 | 552 |
| at 150° C., X-linked | — | — | — | — | — | — | 248 | 268 | 144 | 312 | 216 | 480 | 436 |
| at 175° C., not X-linked | — | — | — | — | — | — | 104 | 104 | 32 | 112 | 88 | 184 | 179 |
| at 175° C., X-linked | — | — | — | — | — | — | 104 | 80 | 32 | 128 | 104 | 179 | 160 |

| Example No. | 14 | 15 | 16 | 17 | 18 | 19 | 20 | 21 | 22 | 23 | 24 | 25 | 26 |
|---|---|---|---|---|---|---|---|---|---|---|---|---|---|
| POLYAMIDE | | | | | | | | | | | | | |
| Nylon 11 | 98 | 98 | 78 | 97.5 | 97 | 77 | 97 | 77 | 94.5 | 94 | 74 | 94 | 74 |
| Nylon 11 (stabilized) | — | — | — | — | — | — | — | — | — | — | — | — | — |
| Nylon 12 | — | — | — | — | — | — | — | — | — | — | — | — | — |
| Nylon 12 (stabilized) | — | — | — | — | — | — | — | — | — | — | — | — | — |
| Nylon 6 | — | — | — | — | — | — | — | — | — | — | — | — | — |
| IONOMER | 20 | — | 20 | — | — | 20 | — | 20 | — | — | 20 | — | 20 |
| ANTIOXIDANT | | | | | | | | | | | | | |
| Aminox | 0.25 | — | — | 0.5 | 0.5 | 0.5 | — | — | 1.25 | 1.25 | 1.25 | — | — |
| Zetax | 0.375 | — | — | 0.75 | 0.75 | 0.75 | — | — | 1.88 | 1.88 | 1.88 | — | — |
| Irganox 1098 | — | — | — | — | — | — | — | — | — | — | — | — | — |
| Irganox 1010 | — | — | — | — | — | — | — | — | — | — | — | — | — |
| Weston 618 | — | 0.168 | 0.168 | — | — | — | 0.33 | 0.33 | — | — | — | 0.83 | 0.83 |
| Plastanox 1212 | — | — | — | — | — | — | — | — | — | — | — | — | — |
| Ferroant | — | — | — | — | — | — | — | — | — | — | — | — | — |
| Age Rite White | — | 0.5 | 0.5 | — | — | — | 1.0 | 1.0 | — | — | — | 2.5 | 2.5 |
| CROSS-LINKING AGENT | 1.0 | 1.0 | 1.0 | 0.5 | 1.0 | 1.0 | 1.0 | 1.0 | 0.5 | 1.0 | 1.0 | 1.0 | 1.0 |

-continued

| | | | | | | | | | | | | | |
|---|---|---|---|---|---|---|---|---|---|---|---|---|---|
| PIGMENT | — | — | — | — | — | — | — | — | — | — | — | — | — |
| ZINC OXIDE | 0.375 | 0.33 | 0.33 | 0.75 | 0.75 | 0.75 | 0.66 | 0.66 | 1.88 | 1.88 | 1.88 | 1.66 | 1.66 |
| ZEOLITE | — | — | — | — | — | — | — | — | — | — | — | — | — |
| $SiO_2 + Al_2O_3$ (106:86) | — | — | — | — | — | — | — | — | — | — | — | — | — |
| FAILURE TIME (hours) | | | | | | | | | | | | | |
| at 150° C., not X-linked | 248 | 384 | 312 | 524 | 504 | 268 | 504 | 384 | 524 | 504 | 436 | 584 | 584 |
| at 150° C., X-linked | 248 | 408 | 336 | 480 | 504 | 268 | 480 | 408 | 480 | 528 | 504 | 584 | 608 |
| at 175° C., not X-linked | 80 | 136 | 128 | 168 | 160 | 88 | 185 | 152 | 168 | 179 | 203 | 211 | 251 |
| at 175° C., X-linked | 88 | 152 | 128 | 179 | 179 | 104 | 160 | 152 | 160 | 185 | 227 | 203 | 227 |

| Example No. | 27 | 28 | 29 | 30 | 31 | 32 | 33 | 34 | 35 | 36 | 37 | 38 | 39 |
|---|---|---|---|---|---|---|---|---|---|---|---|---|---|
| POLYAMIDE | | | | | | | | | | | | | |
| Nylon 11 | — | 99.6 | 99 | 98.5 | 97.5 | 94.5 | — | 95 | 95 | — | — | — | — |
| Nylon 11 (stabilized) | 98.12 | — | — | — | — | — | 98.12 | — | — | — | — | — | — |
| Nylon 12 | — | — | — | — | — | — | — | — | — | 100 | — | 98.5 | 78.5 |
| Nylon 12 (stabilized) | — | — | — | — | — | — | — | — | — | — | 100 | — | — |
| Nylon 6 | — | — | — | — | — | — | — | — | — | — | — | — | — |
| IONOMER | — | — | — | — | — | — | — | — | — | — | — | — | — |
| ANTIOXIDANT | * | | | | | | * | | | | * | | |
| Aminox | — | 0.10 | 0.125 | 0.25 | 0.5 | 1.25 | — | 1.25 | 1.25 | — | — | — | — |
| Zetax | — | 0.15 | 0.188 | 0.775 | 0.75 | 1.88 | — | 1.88 | 1.88 | — | — | — | — |
| Irganox 1098 | — | — | — | — | — | — | — | — | — | — | — | — | — |
| Irganox 1010 | — | — | — | — | — | — | — | — | — | — | — | — | — |
| Weston 618 | — | — | — | — | — | — | — | — | — | — | — | 0.083 | 0.083 |
| Plastanox 1212 | — | — | — | — | — | — | — | — | — | — | — | — | — |
| Ferroant | — | — | — | — | — | — | — | — | — | — | — | — | — |
| Age Rite White | — | — | — | — | — | — | — | — | — | — | — | 0.25 | 0.25 |
| CROSS-LINKING AGENT | — | — | 0.50 | 0.50 | 0.50 | 0.50 | — | — | — | — | — | 1.0 | 1.0 |
| PIGMENT | — | — | — | — | — | — | — | — | — | — | — | — | — |
| ZINC OXIDE | 1.88 | — | — | — | — | — | — | — | — | — | — | 0.17 | 0.17 |
| ZEOLITE | — | 0.15 | 0.188 | 0.375 | 0.75 | 1.88 | 1.88 | 1.88 | — | — | — | — | — |
| $SiO_2 + Al_2O_3$ (106:86) | — | — | — | — | — | — | — | — | 1.88 | — | — | — | — |
| FAILURE TIME (hours) | | | | | | | | | | | | | |
| at 150° C., not X-linked | 384 | 360 | 136 | 556 | 804 | 828 | 840 | 984 | 704 | 24 | 168 | 336 | 192 |
| at 150° C., X-linked | — | — | 248 | 248 | 774 | 822 | — | — | — | — | — | 336 | 144 |
| at 175° C., not X-linked | — | — | 64 | 208 | 272 | 272 | — | — | — | — | — | 128 | 80 |
| at 175° C., X-linked | — | — | 104 | 112 | 185 | 275 | — | — | — | — | — | 112 | 80 |

| Example No. | 40 | 41 | 42 | 43 | 44 | 45 | 46 | 47 | 48 | 49 | 50 | 51 | 52 |
|---|---|---|---|---|---|---|---|---|---|---|---|---|---|
| POLYAMIDE | | | | | | | | | | | | | |
| Nylon 11 | — | — | — | — | — | — | — | — | — | — | — | — | — |
| Nylon 11 (stabilized) | — | — | — | — | — | — | — | — | — | — | — | — | — |
| Nylon 12 | 98 | 78 | 97 | 77 | 94 | 74 | — | 91.0 | 90.5 | 90.5 | 20 | — | 90.5 |
| Nylon 12 (stabilized) | — | — | — | — | — | — | 98.12 | — | — | — | — | 98.12 | — |
| Nylon 6 | — | — | — | — | — | — | — | — | — | — | — | — | — |
| IONOMER | — | 20 | — | 20 | — | 20 | — | — | — | — | — | — | — |
| ANTIOXIDANT | | | | | | | * | | | | | * | |
| Aminox | — | — | — | — | — | — | — | — | — | — | 1.20 | — | — |
| Zetax | — | — | — | — | — | — | — | — | — | — | 1.80 | — | — |
| Irganox 1098 | — | — | — | — | — | — | — | 2.25 | — | — | — | — | 2.25 |
| Irganox 1010 | — | — | — | — | — | — | — | — | 1.80 | — | — | — | — |
| Weston 618 | 0.167 | 0.167 | 0.33 | 0.33 | 0.83 | 0.83 | — | 0.75 | — | 0.75 | — | — | 0.75 |
| Plastanox 1212 | — | — | — | — | — | — | — | — | 1.20 | — | — | — | — |
| Ferroant | — | — | — | — | — | — | — | — | — | 2.25 | — | — | — |
| Age Rite White | 0.5 | 0.5 | 1.0 | 1.0 | 2.5 | 2.5 | — | — | — | — | — | — | — |
| CROSS-LINKING AGENT | 1.0 | 1.0 | 1.0 | 1.0 | 1.0 | 1.0 | — | 0.5 | 0.5 | 0.5 | 0.5 | — | 0.5 |
| PIGMENT | — | — | — | — | — | — | — | 4.0 | 3.5 | 4.0 | 4.0 | — | 4.0 |
| ZINC OXIDE | 0.33 | 0.33 | 0.67 | 0.67 | 1.66 | 1.66 | 1.88 | 2.0 | 2.0 | 2.0 | 2.0 | — | — |
| ZEOLITE | — | — | — | — | — | — | — | — | — | — | — | 1.88 | 2.0 |
| $SiO_2 + Al_2O_3$ (106:86) | — | — | — | — | — | — | — | — | — | — | — | — | — |
| FAILURE TIME (hours) | | | | | | | | | | | | | |
| at 150° C., not X-linked | 552 | 248 | 608 | 408 | 480 | 632 | 312 | 600 | 408 | 240 | 840 | 624 | 984 |
| at 150° C., X-linked | 504 | 248 | 576 | 384 | 552 | 608 | — | 552 | 408 | 240 | 696 | — | 960 |
| at 175° C., not X-linked | 179 | 104 | 185 | 160 | 128 | 251 | — | — | — | — | — | — | — |
| at 175° C., X-linked | 152 | 104 | 179 | 179 | 112 | 251 | — | 240 | 120 | 120 | 192 | — | 240 |

| Example No. | 53 | 54 | 55 | 56 | 57 | 58 | 59 |
|---|---|---|---|---|---|---|---|
| POLYAMIDE | | | | | | | |
| Nylon 11 | — | — | — | — | — | — | — |
| Nylon 11 (stabilized) | — | — | — | — | — | — | — |
| Nylon 12 | 90.5 | 90.5 | 90.5 | — | — | — | — |
| Nylon 12 (stabilized) | — | — | — | — | — | — | — |
| Nylon 6 | — | — | — | 100 | 97.5 | 97.5 | 96.5 |
| IONOMER | | | | | | | |
| ANTIOXIDANT | | | | | | | |
| Aminox | — | — | 1.20 | — | 1.0 | 0.6 | 1.0 |
| Zetax | — | — | 1.80 | — | 1.5 | 0.9 | 1.5 |
| Irganox 1098 | — | — | — | — | — | — | — |
| Irganox 1010 | 1.80 | — | — | — | — | — | — |
| Weston 618 | — | 0.75 | — | — | — | — | — |

| | | | | | | | |
|---|---|---|---|---|---|---|---|
| Plastanox 1212 | 1.20 | — | — | — | — | — | — |
| Ferroant | — | 2.25 | — | — | — | — | — |
| Agerite White | — | — | — | — | — | — | — |
| CROSS-LINKING AGENT | 0.5 | 0.5 | 0.5 | — | — | — | — |
| PIGMENT | 4.0 | 4.0 | 4.0 | — | — | — | — |
| ZINC OXIDE | — | — | — | — | — | — | — |
| ZEOLITE | 2.0 | 2.0 | 2.0 | — | — | 1.0 | 1.0 |
| SiO$_2$ + Al$_2$O$_3$ (106:86) | — | — | — | | | | |
| FAILURE TIME (hours) | | | | | | | |
| at 150° C., not X-linked | 960 | 552 | 840 | 24 | >420 | >420 | >420 |
| at 150° C., X-linked | 960 | 456 | 912 | — | — | — | — |
| at 175° C., not X-linked | — | — | — | 16 | 88 | 88 | 136 |
| at 175° C., X-linked | 288 | 120 | 192 | — | — | — | — |

I claim:

1. A composition which comprises
(a) an organic polymer component which comprises a polyamide;
(b) distributed in said polymer component, at least 0.5% by weight, based on the weight of the polyamide component, of an antioxidant; and
(c) dispersed in said polymer component, an oxide which is present in an amount of from 0.5 to 5.0% by weight of the polyamide component and which can function as an acid scavenger in the composition, which is free from any coupling agent which substantially reduces its efficacy as an acid scavenger, and which is selected from
  (i) metal oxides which consist of oxygen and at least one metal, said at least one metal comprising a metal of Group II or III of the Periodic Table; and
  (ii) oxides which consist of oxygen, silicon, and at least one metal, said at least one metal comprising a metal of Group II or III of the Periodic Table;

the total amount of the antioxidant (b) and the oxide (c) being at least 1% by weight, based on the weight of the polyamide.

2. A composition according to claim 1 wherein the polymer component comprises at least 70% by weight of polyamide.

3. A composition according to claim 1 wherein the polymer component consists essentially of polyamide.

4. A composition according to claim 1 wherein the polyamide comprises at least 25% by weight of units having the formula —NH—(CH$_2$)$_p$—CO— where p is an integer selected from 6, 9, 10, 11 and 12.

5. A composition according to claim 1 wherein the polyamide comprises at least 75% by weight of units having the formula —NH—(CH$_2$)$_p$—CO— where p is an integer selected from 6, 9, 10, 11 and 12.

6. A composition according to claim 1 wherein the polymer component comprises at least 70% by weight of at least one polyamide selected from Nylon-6, Nylon-6,6, Nylon-6,9, Nylon-6,10, Nylon-6,12, Nylon-11 and Nylon-12.

7. A composition according to claim 1 wherein the polymer component consists essentially of at least one polyamide selected from Nylon-6, Nylon-6,6, Nylon-6,12, Nylon-11, and Nylon-12.

8. A composition according to claim 1 which contains 0.5 to 7.5% by weight of antioxidant.

9. A composition according to claim 8 which contains 1 to 5% by weight of antioxidant.

10. A composition according to claim 9 which contains 2 to 4% by weight of antioxidant.

11. A composition according to claim 1 wherein the antioxidant is selected from the group consisting of reaction products of an aromatic polyamine and an aliphatic ketone, aromatic mercapto compounds and salts thereof, compounds containing at least one hindered phenol moiety and aromatic compounds containing amine groups.

12. A composition according to claim 1 wherein component (c) comprises at least 0.5% by weight, based on the weight of the polyamide, of an oxide of at least one of magnesium, calcium, zinc, manganese or aluminum.

13. A composition according to claim 12 which contains at least 1% by weight of component (c), based on the weight of the polyamide.

14. A composition according to claim 12 which contains 0.5 to 5% by weight of component (c), based on the weight of the polyamide.

15. A composition according to claim 12 which contains 1 to 3% by weight of component (c), based on the weight of the polyamide.

16. A composition according to claim 1 wherein component (c) comprises a crystalline aluminosilicate.

17. A composition according to claim 16 which contains 0.5 to 5% by weight of a zeolitic molecular sieve, based on the weight of the polyamide.

18. A composition according to claim 17 which contains 1 to 3% by weight of a zeolitic molecular sieve, based on the weight of the polyamide.

19. A composition according to claim 1 wherein component (c) comprises zinc oxide.

20. A composition according to claim 19 which contains at least 0.5% by weight of zinc oxide, based on the weight of the polyamide.

21. A composition according to claim 20 which contains at least 0.7% by weight of zinc oxide, based on the weight of the polyamide.

22. A composition according to claim 1 which contains a pigment.

23. A composition according to claim 1 wherein the organic polymer component consists essentially of Nylon-11, and the compound (c) is zinc oxide in amount at least 0.5%, based on the weight of the Nylon-11.

24. A composition according to claim 1 wherein the organic polymer component consists essentially of Nylon-12, and the compound (c) is zinc oxide in amount at least 0.5%, based on the weight of the Nylon-12.

25. A composition according to claim 1 wherein the organic polymer component consists essentially of Nylon-6, and the compound (c) is zinc oxide in amount at least 0.5%, based on the weight of the Nylon-6.

26. A composition according to claim 25 wherein the amount of zinc oxide is 1 to 3%.

27. A composition which comprises
(a) an organic polymer component which comprises at least 70% by weight of a polyamide selected from Nylon-6, Nylon-6,6, Nylon-6,9, Nylon-6,10, Nylon-6,12, Nylon-11 and Nylon-12;
(b) distributed in said polymer component, an antioxidant; and
(c) dispersed in said polymer component, a crystalline aluminosilicate which is present in an amount of from 0.5 to 5.0% by weight of the polyamide component and which can function as an acid scavenger in the composition, which is free from any coupling agent which sustantially reduces its effacy as a scavenging agent, and which consists of oxygen, silicon and at least one metal, said at least one metal comprising aluminum;
the total amount of the antioxidant (b) and the compound (c) being at least 1% by weight based on the weight of the polyamide.

28. A composition according to claim 27 which contains 2 to 4% by weight of component (b) and 1 to 3% by weight of component (c), based on the weight of the polyamide.

29. A composition according to claim 27 wherein the antioxidant is selected from aromatic compounds containing amine groups, aromatic mercapto compounds, salts of aromatic mercapto compounds and compounds containing at least one hindered phenol moiety.

30. A composition according to claim 27 wherein component (c) comprises a synthetic zeolite.

31. A composition according to claim 27 wherein the polymer component consists essentially of at least one polyamide selected from Nylon-6, Nylon-6,6, Nylon-6,9, Nylon-6,10, Nylon-6,12, Nylon-11 and Nylon-12.

32. A composition according to claim 27 wherein the polymer component consists essentially of Nylon-11 or Nylon-12.

33. A composition according to claim 32 which has been radiation cross-linked.

34. A composition according to claim 33 which is in the form of a heat-recoverable article.

35. A composition according to claim 27 wherein the organic polymer component consists essentially of Nylon-6 and the crystalline aluminosilicate is a zeolite which is present in amount at least 1% by weight, based on the weight of the polyamide.

36. A composition according to claim 27 wherein the organic polymer component consists essentially of Nylon-6,12 and the crystalline aluminosilicate is a zeolite which is present in amount at least 1% by weight, based on the weight of the polyamide.

37. A composition according to claim 27 wherein the organic polymer component consists essentially of Nylon-11 and the crystalline aluminosilicate is a zeolite which is present in amount at least 1% by weight, based on the weight of the polyamide.

38. A composition according to claim 27 wherein the organic polymer component consists essentially of Nylon-12 and the crystalline aluminosilicate is a zeolite which is present in amount at least 1% by weight, based on the weight of the polyamide.

39. A composition according to claim 27 wherein the organic polymer component and the antioxidant are in the form of a commercially available stabilized polyamide.

* * * * *